United States Patent
Bihr et al.

(10) Patent No.: US 12,516,874 B2
(45) Date of Patent: Jan. 6, 2026

(54) METHOD FOR INSTALLING A CAMERA ON AN INTERIOR-COMPARTMENT WALL OF A DOMESTIC APPLIANCE, AND DOMESTIC APPLIANCE

(71) Applicant: BSH Hausgeräte GmbH, Munich (DE)

(72) Inventors: Daniel Bihr, Kirchheim am Ries (DE); Stephan Kempfle, Ellzee (DE); Christopher Rodney, Villenbach (DE); Joachim Schäferling, Bissingen (DE)

(73) Assignee: BSH Hausgeräte GmbH, Munich (DE)

( * ) Notice: Subject to any disclaimer, the term of this patent is extended or adjusted under 35 U.S.C. 154(b) by 269 days.

(21) Appl. No.: 18/259,632

(22) PCT Filed: Jan. 12, 2022

(86) PCT No.: PCT/EP2022/050519
§ 371 (c)(1),
(2) Date: Jun. 28, 2023

(87) PCT Pub. No.: WO2022/157046
PCT Pub. Date: Jul. 28, 2022

(65) Prior Publication Data
US 2024/0060714 A1 Feb. 22, 2024

(30) Foreign Application Priority Data
Jan. 20, 2021 (DE) ...................... 10 2021 200 493.8

(51) Int. Cl.
*F25D 29/00* (2006.01)
*G03B 29/00* (2021.01)

(52) U.S. Cl.
CPC ........... *F25D 29/005* (2013.01); *G03B 29/00* (2013.01); *F25D 2400/40* (2013.01); *F25D 2700/06* (2013.01)

(58) Field of Classification Search
None
See application file for complete search history.

(56) References Cited

U.S. PATENT DOCUMENTS 9,010,884 B2 * 4/2015 Heinrich .................. H05K 5/10
312/223.6
10,634,416 B2 4/2020 Fähnle et al.

FOREIGN PATENT DOCUMENTS

CN 105793655 A 7/2016
CN 112005066 A 11/2020
(Continued)

*Primary Examiner* — Rodney E Fuller
(74) *Attorney, Agent, or Firm* — Lawrence A. Greenberg; Werner H. Stemer; Laurence A. Greenberg

(57) ABSTRACT

A method for installing a camera on a wall of an interior compartment of a domestic appliance has the following steps: providing a mounting part and a camera, which are separate from one another; fastening the mounting part at an aperture in the wall; moving the camera towards the mounting part along a first installation direction, which is perpendicular to the plane of the aperture, to join the camera and the mounting part through the aperture and to achieve an interim installation state, wherein the camera and the mounting part are arranged on the opposite sides of the wall; displacing the camera relative to the mounting part in a second installation direction, parallel to the plane of the aperture, until an end position of the camera on the mounting part is reached.

16 Claims, 7 Drawing Sheets

(56) References Cited

FOREIGN PATENT DOCUMENTS

| | | | |
|---|---|---|---|
| DE | 69818568 T2 | 4/2004 | |
| DE | 102006012922 A1 * | 9/2007 | ........... F25D 23/067 |
| DE | 102009000667 A1 | 8/2010 | |
| DE | 102010043546 A1 | 5/2012 | |
| DE | 102013216767 A1 | 2/2015 | |
| DE | 102015216921 A1 * | 3/2017 | |
| DE | 102019205875 A1 | 10/2020 | |
| EP | 0892230 A1 * | 1/1999 | |
| WO | WO-2012062570 A2 * | 5/2012 | .............. F21V 21/08 |

* cited by examiner

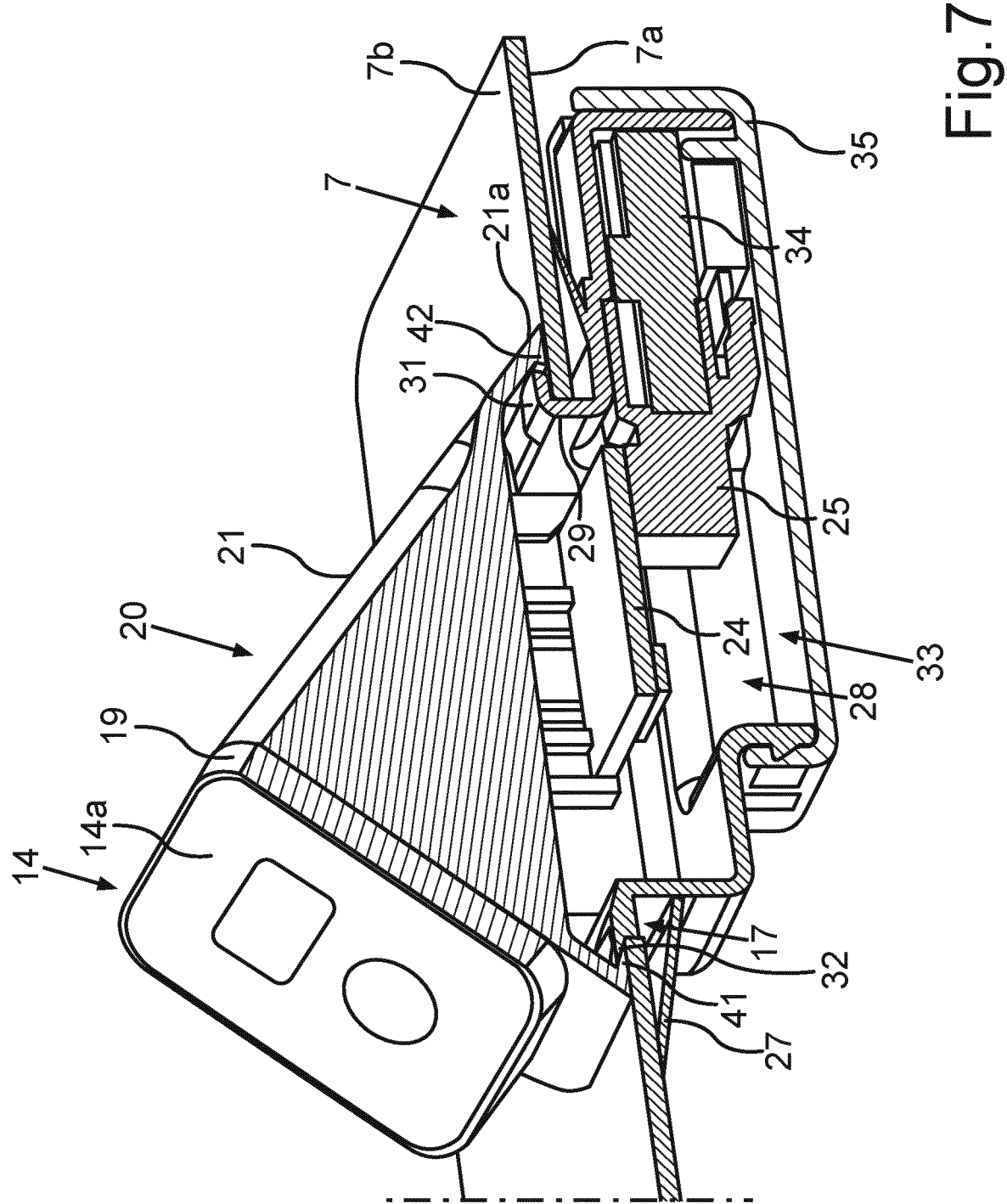

METHOD FOR INSTALLING A CAMERA ON AN INTERIOR-COMPARTMENT WALL OF A DOMESTIC APPLIANCE, AND DOMESTIC APPLIANCE

FIELD AND BACKGROUND OF THE INVENTION

One aspect of the invention relates to a method for installing a camera on a wall of an interior compartment of a household appliance. A further aspect relates to a household appliance.

In modern household appliances, such as for example a household refrigeration appliance, it is known for at least one camera to be present with which a receiving space for foodstuffs can be recorded. In household refrigeration appliances, it is known for such a camera to be arranged on a wall of an interior compartment which delimits the receiving space. Because specifically in household refrigeration appliances a thermal insulation is required between the interior compartment and the outer housing of the household refrigeration appliance, such a fastening is more difficult. To enable this, a reinforcement part is used in addition to a camera. Said reinforcement part is usually arranged in an intermediate space between the interior compartment and the outer housing. The reinforcement part is thus arranged in particular on the foam side. This means that it is arranged in the intermediate space containing thermal insulating foam between the interior compartment and the outer housing. Such an embodiment is disclosed, for example, in DE 10 2013 216 767 A1. A reinforcement part of this type is snap-fitted in a recess of a wall of the interior compartment. Furthermore, a support for a camera housing and an illumination unit is inserted into the reinforcement part and simultaneously snap-fitted therein. Connection interfaces which are present for the electrical connection of the camera are integrated in a rear wall of the reinforcement part or guided into the interior of the reinforcement part by means of a cable.

In this embodiment, the installation and positioning of the camera is relatively complex. The connection interfaces must be connected to one another with a correspondingly high degree of installation effort. To this end, they must be additionally joined together and cabled only after the camera has been installed.

SUMMARY OF THE INVENTION

It is the object of the present invention to create a method and a household appliance in which the installation of a camera of the household appliance is improved.

This object is achieved by a method and a household appliance as claimed in the independent claims.

One aspect of the invention relates to a method for installing a camera on a wall of an interior compartment of a household refrigeration appliance. The interior compartment is in particular made of plastic. Here, the interior compartment is firstly provided. Furthermore, a reinforcement part which is separate from the interior compartment is provided. The reinforcement part is embodied in accordance with the intended purpose for direct mechanical connection to a camera through a recess in the wall. This recess is embodied in the wall of the interior compartment.

Furthermore, a camera which is separate from the reinforcement part is provided. The camera is provided with a housing in a first electrical plug connector. The electrical plug connector is arranged in the housing. This housing of the camera and the reinforcement part are then arranged on opposite sides of the wall. The reinforcement part is fastened to the wall in the region of the recess. In a further step, the camera, in particular the housing thereof, is moved toward the reinforcement part along a first installation direction. This first installation direction is oriented in accordance with the intended purpose in particular perpendicular to the plane of this recess. By the camera being moved toward the reinforcement part along this first installation direction, the camera and the reinforcement part are joined together through the recess. This produces a first intermediate installation state in which the camera and the reinforcement part are arranged on these opposite sides of the wall. Starting from the intermediate installation state thus achieved, the camera is then displaced relative to the reinforcement part along a second installation direction, which is oriented parallel to the plane of the recess. This displacement of the camera in this second installation direction continues until an end position of the camera on the reinforcement part is reached at the end of this displacement path.

As a result of the proposed method, a very advantageous installation concept for installing the camera is achieved. By the reinforcement part and the camera being arranged on opposite sides of the wall and on the recess and furthermore being directly mechanically connected to one another, the components are also held together securely and reliably. In particular by the reinforcement part being preinstalled on the wall in the region of the recess, in one exemplary embodiment the subsequent installation of the camera on this arrangement with the wall and the reinforcement part already installed thereon can also take place in a simple manner. The camera can then be fastened thereon in a highly targeted manner on account of the abovementioned two installation directions.

This installation concept for the camera is particularly advantageous in that a specific intermediate installation state can also be achieved on account of a multi-stage installation scenario in two different installation directions. This is because initially, in the still entirely contactless state, the camera can be guided very easily along the first installation direction and here it is then already possible to achieve a simple, mechanical direct coupling with the reinforcement part. A very advantageous prepositioning of the components is thus achieved in this intermediate installation state. This is because it is then also possible to move the camera, starting from this intermediate installation state, also in an effectively guided manner in this second installation direction, such that the end position is reached in a simple and targeted manner.

This furthermore results in two very simple installation directions which can be carried out in an intuitively easy manner being specified in which the camera must be moved in order to reach the end position. Complex installation movements are thereby avoided.

Furthermore, it is particularly advantageous that this second installation direction takes place parallel to the recess. In one exemplary embodiment, the camera still rests on the wall when it has achieved the intermediate installation state. If it is then moved in the second installation direction, a certain counter bearing or a guidance is also enabled by the wall. The movement along the second installation direction is also supported particularly easily thereby.

In one exemplary embodiment, the guiding of the reinforcement part on the one hand and of the camera on the other hand toward the recess on opposite sides of the wall is carried out simultaneously at least at certain times. It is however advantageous if, in one exemplary embodiment, the reinforcement part is first guided toward the wall coming from one side and in the region of the recess the reinforcement part is then arranged in a retaining manner directly on the wall. Once this installation state is reached, in the exemplary embodiment it is then possible to guide the camera toward the recess from the opposite side of the wall. In this exemplary embodiment, the respective guiding of the reinforcement part on the one hand and the camera on the other hand toward the wall in the region of the recess thus takes place consecutively.

As a result, the handling steps can be carried out in a targeted and more coordinated manner.

In particular, in order to achieve the intermediate installation state, only a subregion of the camera is guided through the recess and introduced into the reinforcement part. In this context, the reinforcement part preferably has an insertion space, into which this subregion of the camera is introduced along the first installation direction in the installation scenario. Furthermore, on account of this engagement through the recess and then the positioning of a subregion of the camera, the camera is also prevented from being moved out of the recess again inadvertently when the subsequent second installation section, namely the movement along the second installation direction, is carried out.

This installation scenario is also particularly advantageous in that an automatic coupling of electrical plug connectors of the camera on the one hand and of the reinforcement part on the other hand in this insertion space of the reinforcement part is achieved when the displacement along the second installation direction is carried out.

In one exemplary embodiment, the displacement along the second installation direction is carried out in a linear manner. As a result, the installation concept is once again simplified. This is because such a linear movement can take place in a very targeted and simple manner. Jamming or distortions can thus be avoided particularly advantageously. As a result, the installed end state between the camera and the reinforcement part is achieved very reliably.

In one exemplary embodiment, a second electrical plug connector is installed on the reinforcement part and is embodied for connection to the first electrical plug connector. The second electrical plug connector is a separate component. It is arranged on or snap-fitted to the reinforcement part by way of a snap-fit connection. As a result of this exemplary embodiment, too, this second electrical plug connector can be installed easily on the reinforcement part initially in another, separate installation step. It is then already arranged particularly securely thereon. With the reinforcement part and this second electrical plug connector, it is thus possible to produce a preinstallation assembly which is then subsequently guided toward the wall in the region of the recess and is arranged thereon. On account of the advantageous snap-fit connection, this second electrical plug connector can also be fastened easily and quickly to the reinforcement part. In particular, it is provided that the second electrical plug connector is fastened only with a snap-fit connection of this kind. In particular, this means that no further, separate fastening elements, such as screws or the like, are required in order to position the second electrical plug connector on the reinforcement part and retain it thereon.

In one advantageous exemplary embodiment, a cover separate therefrom is installed on the reinforcement part. As a result, the second electrical plug connector is enclosed at least in regions between the reinforcement part and the cover separate therefrom. The second electrical plug connector is thus also arranged in a protected manner. This is also advantageous in that the reinforcement part is arranged in an intermediate space between the interior compartment and an outer housing. In particular if the household appliance is a household refrigeration appliance, thermal insulation material is incorporated into this intermediate space. This is in particular insulating foam. This insulating foam is then also arranged directly on the reinforcement part. On account of this corresponding enclosure of the second electrical plug connector, it is thus not provided that this insulating foam is applied directly to the second electrical plug connector. This enclosed arrangement enables the second electrical plug connector to be positioned separately from this insulating foam. As a result, it is then also made possible that, in the finished state of this household refrigeration appliance, access is still enabled from the foodstuff receiving space, which is delimited by the walls of the interior compartment, via the recess to the second electrical plug connector.

In one exemplary embodiment, the components, namely the reinforcement part, and the second electrical plug connector and the cover form an installation assembly, which is moved in the first installation direction toward the camera in order to be connected to the camera. This, too, enables a simple preinstallation of these said three components relative to one another. The preinstallation assembly can then also be attached simply as a complete unit in the direction of the first installation direction to the trough in the region of the recess.

When this movement of the camera is carried out in the direction of the first installation direction, the electrical plug connector of the camera is also guided through the recess as a subregion and, once the movement of the camera along the first installation direction has been completed, then rests fully on the opposite side of the wall. In one exemplary embodiment, at the end of this movement along the first installation direction, the first electrical plug connector is thus arranged such that it engages fully into the reinforcement part. As a result of a displacement of the camera relative to the reinforcement part along the second installation direction, this first electrical plug connector is thus moved or displaced on the side of the wall on which the second electrical plug connector, which is installed on the reinforcement part, is also located. During this movement along the second installation direction, the first electrical plug connector is therefore then also moved automatically toward the second electrical plug connector on the same side of the wall. As a result of this movement along the second installation direction, the second electrical plug connector is then joined together automatically with the first electrical plug connector. This is a further very advantageous exemplary embodiment, as the mechanical and electrical connection of these two electrical plug connectors can also already be achieved automatically during the installation of the camera and the reinforcement part with one another. An automatic blind joining of these two electrical plug connectors is thus also achieved as a result of this advantageous installation method. When the end position between the camera and the reinforcement part is reached, the joined state between the two electrical plug connectors is then also reached automatically.

In one exemplary embodiment, the reinforcement part is snap-fitted directly on the recess. This reinforcement part is thus also held securely and precisely positioned on the wall itself.

Here, too, in one exemplary embodiment no further fastening elements such as screws or the like are required. In particular, the reinforcement part is fastened on the wall, in particular in the region of the recess, only by way of this snap-fitting.

In one exemplary embodiment, snap-fit elements on the camera are snap-fitted to counter snap-fit elements on the reinforcement part when the camera is moved along the second installation direction. As a result of this direct snap-fitting of the parts to one another, a mechanically stable and simple coupling option is also achieved.

In one exemplary embodiment, a coupling between coupling elements on the camera with counter coupling elements on the reinforcement part takes place when the camera is moved along the second installation direction. This takes place such that the coupling elements engage behind the counter coupling elements and as a result the camera is held on the reinforcement part. In one exemplary embodiment, the coupling elements and the counter coupling elements are thus shaped such that they are arranged overlapping in the end position of the camera on the reinforcement part when viewed in the second installation direction. They thus interlock in this second installation direction. This prevents the camera from becoming detached in the first installation direction.

In one exemplary embodiment, these coupling elements and the counter coupling elements, when viewed in the second installation direction, are arranged on an opposite edge side in comparison to the snap-fit elements and counter snap-fit elements, which are different from the coupling elements and the counter coupling elements. As a result, a precisely positioned seating of the camera on the reinforcement part on the one hand and on the wall on the other hand is achieved. A particularly stable retention and fixed-position embodiment of the camera on the reinforcement part and on the wall in a direction perpendicular to the wall is thus achieved.

In one exemplary embodiment, the snap-fit elements and the counter snap-fit elements do not overlap in this second installation direction and are therefore not embodied interlocking. As a result, a secure and reliable snap-fitting or clamping can be achieved on the one hand. On the other hand, the release of the installed end position of the camera on the reinforcement part is enabled in a simple manner. This is due to the fact that initially a release of the snap-fit connection between the snap-fit elements and the counter snap-fit elements can be achieved, such that subsequently an effective backward movement of the camera along the second installation direction can then take place. As a result, the interlocking state between the coupling element and the counter coupling element is then released again along this second installation direction. The camera can then in turn also be removed easily from the reinforcement part.

In one exemplary embodiment, the coupling elements and/or the counter coupling elements are shaped such that, when the camera is displaced in the second installation direction, they then draw the camera toward the wall in the first installation direction or the camera is pressed onto the wall. In particular, at least one coupling element and/or one counter coupling element are thus embodied with an oblique contact surface, on which the then other element rests and along which said other element slides.

At least the coupling element and/or the counter coupling element are thus embodied in a wedge-shaped manner.

In one exemplary embodiment, the reinforcement part is arranged on the wall coming from one side of the wall such that the counter snap-fit elements and/or the counter coupling elements are guided through the recess and extend to the opposite side of the wall, from which the camera is guided toward the wall along the first installation direction. As a result, a further advantageous exemplary embodiment is achieved in terms of installation. This is due to the fact that, on the side of the wall from which the camera is also guided, these counter coupling elements and/or counter snap-fit elements are then visible to a fitter or robot, so that the mechanical coupling between the said elements can be carried out in a simpler and more targeted manner and in this regard the same can be perceived optically by a fitter or robot. Furthermore, the checking of the installed end state is thus also made simpler thereby with respect to a snap-fitting and/or coupling of the corresponding elements.

The snap-fit elements are functionally different elements from the coupling elements. They are also separate and spaced apart therefrom. The same applies to the respective counter elements.

A further aspect of the invention relates to a household appliance. The household appliance has a camera with a housing and a first electrical plug connector. This first electrical plug connector is arranged in the housing. The household appliance also has a reinforcement part which is separate from the camera. The reinforcement part is embodied in accordance with the intended purpose for direct connection to the housing of the camera through a recess in a wall of an interior compartment of the household appliance. This is embodied such that the housing and the reinforcement part are arranged on opposite sides of the wall in the region of the recess. A second electrical plug connector is arranged on the reinforcement part. This is embodied in accordance with the intended purpose for connection to the first electrical plug connector. The reinforcement part also has an insertion space, into which the camera extends with a subregion in a direction which is perpendicular to the plane of the recess. The insertion space is embodied in a plane parallel to the recess with such dimensions that, during a process provided in accordance with the intended purpose for installing the camera on the reinforcement part, the subregion of the camera can be moved relative to the reinforcement part in accordance with the intended purpose in an installation direction which is parallel to the plane of the recess for setting a defined end position of the camera in the insertion space. This reinforcement part is thus embodied in accordance with the intended purpose with such an insertion space, which enables a corresponding installation scenario, in particular in accordance with the above-cited aspect or an advantageous exemplary embodiment thereof.

In one exemplary embodiment, the reinforcement part has a contact flange for resting on the wall. The reinforcement part also has a receiving slot which is integrated on the contact flange and in which the second plug connector is arranged, in particular is snap-fitted thereto by means of a snap-fit connection. The receiving slot can be an integral part of the insertion space.

In a further exemplary embodiment, a cover of the household appliance separate therefrom is arranged on the reinforcement part such that the second electrical plug connector is arranged enclosed at least in regions between the reinforcement part and the cover.

In one exemplary embodiment, snap-fit elements of the reinforcement part protrude through the recess such that the camera is snap-fitted to the reinforcement part on the side of the wall on which the camera is arranged, in particular snap-fit elements of the camera are snap-fitted to the counter snap-fit elements of the reinforcement part. In particular, this snap-fit connection is embodied on the side of the wall on which the camera is arranged with its housing.

In a further exemplary embodiment, counter coupling elements of the reinforcement part are coupled to coupling elements of the camera. In particular, an overlapping interlocking between the counter coupling element and the coupling element is embodied in a direction extending in a plane parallel to the recess.

In the installed end state of the two electrical plug connectors with one another, these are only joined together. They are not snap-fitted. Because they are only joined together, the camera can then also be released again easily. It is then not necessary to release snap-fit connections between the electrical plug connectors, since no such snap-fit connections are embodied or snap-fitted.

The information "top", "bottom", "front", "rear", "horizontal", "vertical", "depth direction", "width direction", "height direction" indicate the positions and orientations that are provided in the case of intended use and intended positioning of the appliance.

Further features of the invention are disclosed in the claims, the figures and the description of the figures. The features and combinations of features mentioned in the description above and the features and combinations of features set out below in the description of the figures and/or shown in the figures alone are usable not only in the respective combination given, but also in other combinations or alone without departing from the scope of the invention. Embodiments of the invention which are not explicitly shown in the figures and described, but which arise and can be created through separate combinations of features from the embodiments described, are therefore also to be considered as included and disclosed. Embodiments and combinations of features can also be regarded as disclosed which therefore do not have all the features of an originally formulated independent claim.

BRIEF DESCRIPTION OF THE FIGURES

Exemplary embodiments of the invention are further explained below with reference to schematic drawings, in which:

FIG. 7 shows a perspective representation of the installed end state in accordance with FIG. 6.

DETAILED DESCRIPTION OF THE INVENTION

Figure 1:
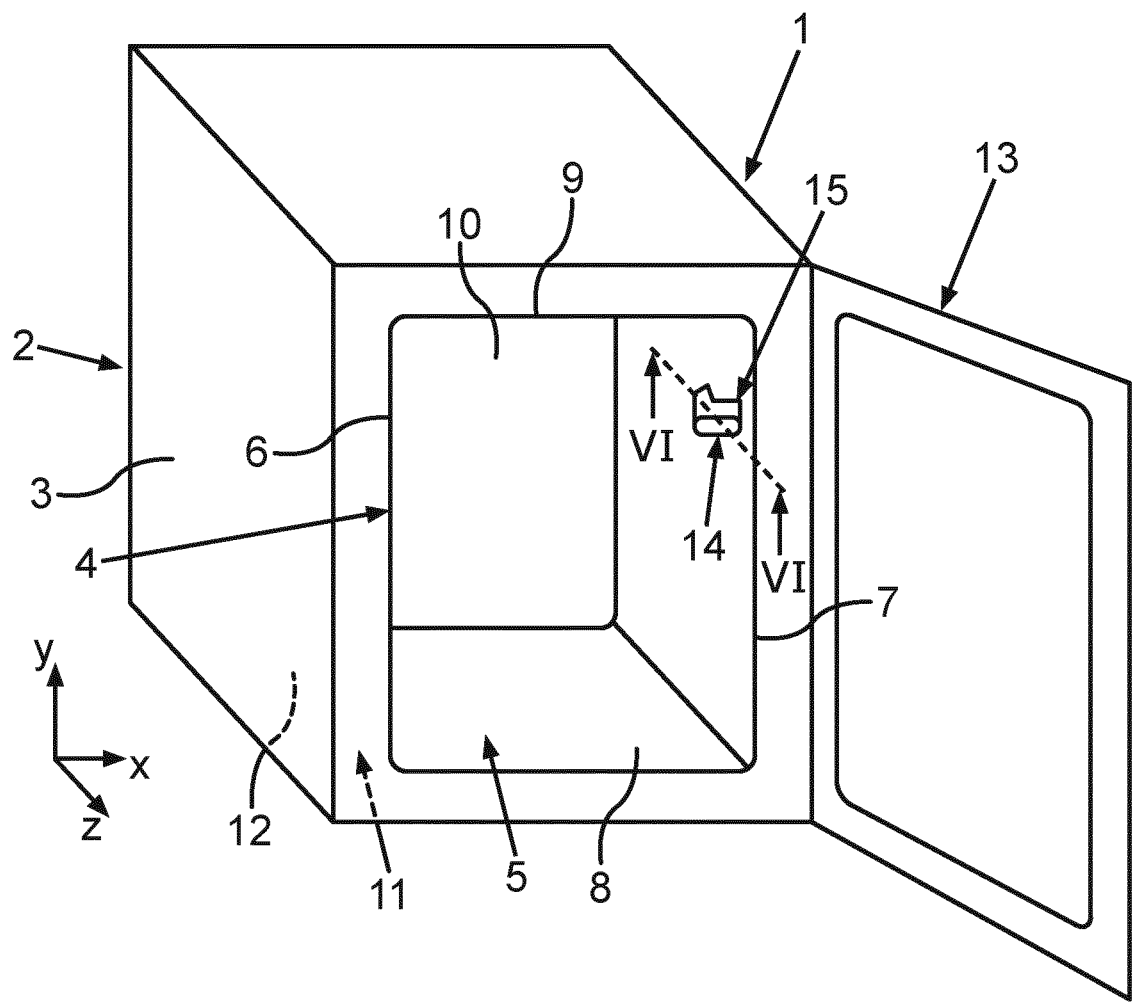
FIG. 1 shows a schematic representation of a household appliance.

In the figures, identical or functionally identical elements are provided with the same reference characters.

FIG. 1 shows a simplified representation of a household appliance 1. Here, the household appliance 1 is a household refrigeration appliance. It is embodied in particular for storing and conserving foodstuffs. The household refrigeration appliance can be for example a refrigerator or a freezer or a combined fridge-freezer.

The household refrigeration appliance has a housing 2. The housing 2 has an outer housing 3. An interior compartment 4 separate therefrom is arranged in the outer housing 3. The interior compartment 4 is in particular made entirely of plastic. The interior compartment 4 has walls which delimit a receiving space 5 for foodstuffs. The receiving space 5 can be for example a refrigerator compartment or a freezer compartment. The receiving space 5 is delimited by vertical side walls 6 and 7, a base wall 8, a ceiling wall 9, and a rear wall 10 of the interior compartment 4. An intermediate space 11 between the outer housing 3 and the interior compartment 4 contains a thermal insulation material 12. In particular, this can be for example an insulating foam.

Furthermore, the household refrigeration appliance has a door 13. This is arranged movably on the housing 2. It is provided to close the receiving space 5 on the front side.

Furthermore, the household refrigeration appliance has a camera 14. The camera 14 is arranged here on a vertical side wall, in particular the vertical side wall 7, of the interior compartment 4. It is provided for recording the receiving space 5. A reinforcement part 15, which is arranged in the intermediate space 11, is provided and installed for mechanical retention or direct mechanical coupling with the camera 14.

Figure 2:
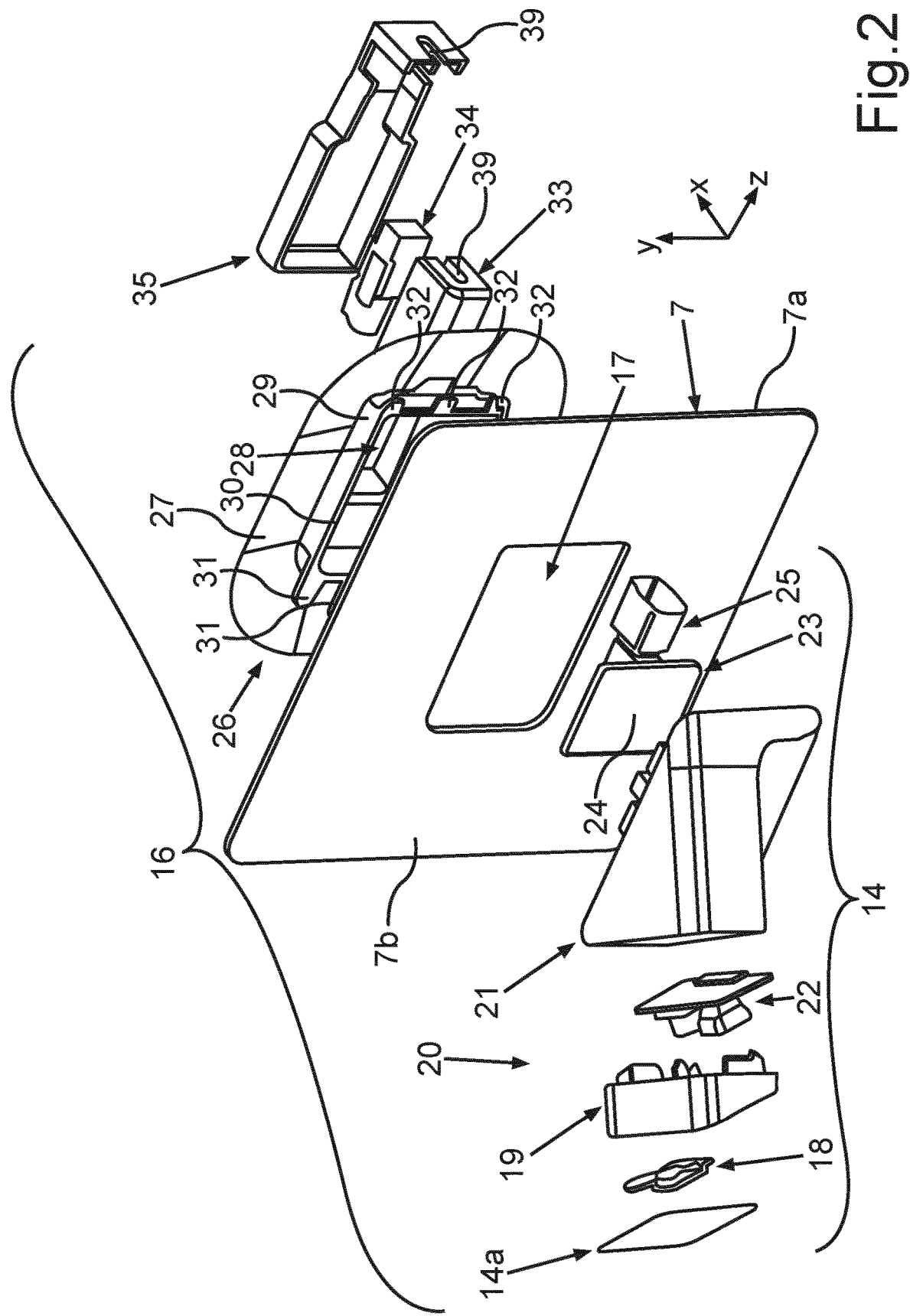
FIG. 2 shows an exploded representation of an exemplary embodiment of an arrangement according to the invention of a camera with a reinforcement part.

FIG. 2 shows an exploded representation of an arrangement 16. The arrangement 16 has the wall of the interior compartment 4, here for example the wall 7. A recess 17 is embodied in the wall 7. The recess 17 is a through-hole. The recess 17 is circumferentially fully closed in the plane of the wall 7 and thus delimited by a circumferential defining edge.

Furthermore, the arrangement 16 has the camera 14. The camera 14 has a cover 14a. This cover 14a is in particular an anti-fog element. Furthermore, the camera 14 is embodied with at least one lens 18. The camera 14 also has a closing element 19. The closing element 19 is an integral part of a housing 20 of the camera 14. In one exemplary embodiment, a further integral part of the housing 20 is a housing arm 21. In one exemplary embodiment, the camera 14 also has an electronics module 22. The electronics module 22 has in particular a circuit board and an image sensor mounted thereon.

In one exemplary embodiment, the camera 14 also has a connector module 23. This connector module 23 has a circuit board 24 and a first electrical plug connector 25.

FIG. 2 also shows a reinforcement part 26, which is separate from the wall 7 and the camera 14. The reinforcement part 26 is embodied in one piece. It has a contact flange 27. With this contact flange 27, which is circumferentially closed, the reinforcement part 26 rests on an outer side 7a of the wall 7. Furthermore, the reinforcement part 26 has an insertion space 28. The insertion space 28 is embodied and provided in accordance with the intended purpose to receive the first electrical plug connector 25. In the installed state, this first electrical plug connector 25 therefore engages into this insertion space 28. The insertion space 28 is embodied in particular open toward the rear.

The insertion space 28 is delimited circumferentially by a collar 29 in the front region facing toward the wall 7. This collar 29 engages through the recess 17 in the installed state of the reinforcement part 26. A web 30 is embodied on the end of this collar 29 opposite the contact flange 27. In the installed state, the web 30 is located on the side of the wall 7 on which at least the housing 20 of the camera 14 is also located.

As can also be seen in FIG. 2, the reinforcement part 26 has several counter snap-fit elements 31 in the exemplary embodiment. In particular, these are embodied on the web 30.

Furthermore, the reinforcement part 26 has several counter coupling elements 32 in the exemplary embodiment. In particular, these are embodied on the web 30. As can be seen in FIG. 2, the counter snap-fit elements 31 and the counter coupling elements 32 are molded on opposite web sections of the web 30, in particular embodied in one piece therewith. In the installed state of the reinforcement part 26 on the wall 7, the counter snap-fit elements 31 and the counter coupling elements 32 are arranged on the side of the wall 7 on which the housing 20 of the camera 14 is also located.

In the installed state of the reinforcement part 26 on the wall 7, this reinforcement part 26 thus extends on both sides of the recess 17. The predominant and main part of the reinforcement part 26 in terms of size is however arranged on the side of the wall 7 which faces toward the outer side 7a. Opposite this, the camera 14 with its predominant region viewed in terms of size is arranged on the opposite side of the wall 7. In particular, it is arranged on the side of the wall 7 facing toward the inner side 7b. The inner side 7b faces toward the receiving space 5.

In one exemplary embodiment, the reinforcement part 26 has a receiving slot 33. The receiving slot 33 is embodied in one piece with the rest of the reinforcement part 26. The reinforcement part 26 can be embodied for example from plastic, in particular as an injection-molded component. The receiving slot 33 is an integral part of the insertion space 28.

The receiving slot 33 is embodied in accordance with the intended purpose to receive a second electrical plug connector 34 of the arrangement 16 which is separate therefrom. For this purpose, the receiving slot 33 is embodied open on the side facing away from the contact flange 27. The second electrical plug connector 34 is embodied in accordance with the intended purpose for positioning in this receiving slot 33. The arrangement 16 also has a cover 35. The cover 35 is separate from the reinforcement part 26. It is provided in accordance with the intended purpose for fitting on the receiving slot 33, so that here a closed volume space is formed in which the first electrical plug connector 34 is arranged. In particular, it is then arranged at least partially enclosed therein.

The cover 35 is fastened with at least one snap-fit connection to the receiving slot 33. Furthermore, in one exemplary embodiment the first electrical plug connector 34 is arranged held in the receiving slot 33 by a snap-fit connection. Additional fastening elements, such as for example screws or the like, are then not provided and not required. Likewise, in one exemplary embodiment the fastening of the cover 35 can be embodied merely by a snap-fit connection or several snap-fit connections on the receiving slot 33. Here, too, it is then possible to dispense with further fastening elements.

Figure 3:
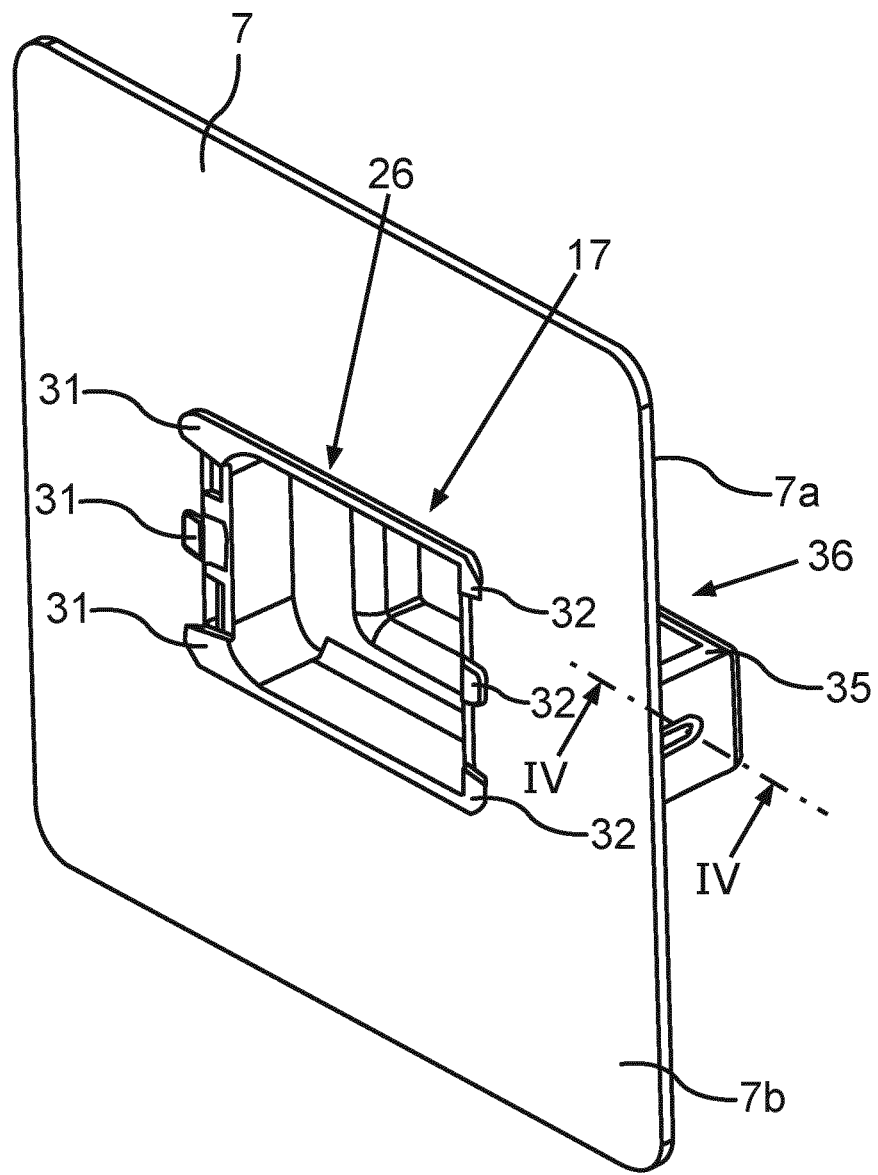
FIG. 3 shows a perspective representation of a preinstallation assembly having a reinforcement part, a second electrical plug connector and a cover, which is installed on a wall of the interior compartment.

FIG. 3 shows a perspective representation of a preinstallation assembly 36. This has the wall 7, the reinforcement part 26, the first electrical plug connector 34, and the cover 35.

With regard to installation, it is thus provided that firstly the second electrical plug connector 34 is fitted in the receiving slot 33. In particular, it is snap-fitted therein. Then the cover 35 is installed on the receiving slot 33. The preinstallation assembly 36 thus produced is then installed on the wall 7, as shown in FIG. 3. Here the reinforcement part 26 protrudes with the collar 29 through the recess 17 such that the web 30 with the counter snap-fit elements 31 and the counter coupling elements 32 are arranged on the opposite side of the wall 7.

Figure 4:
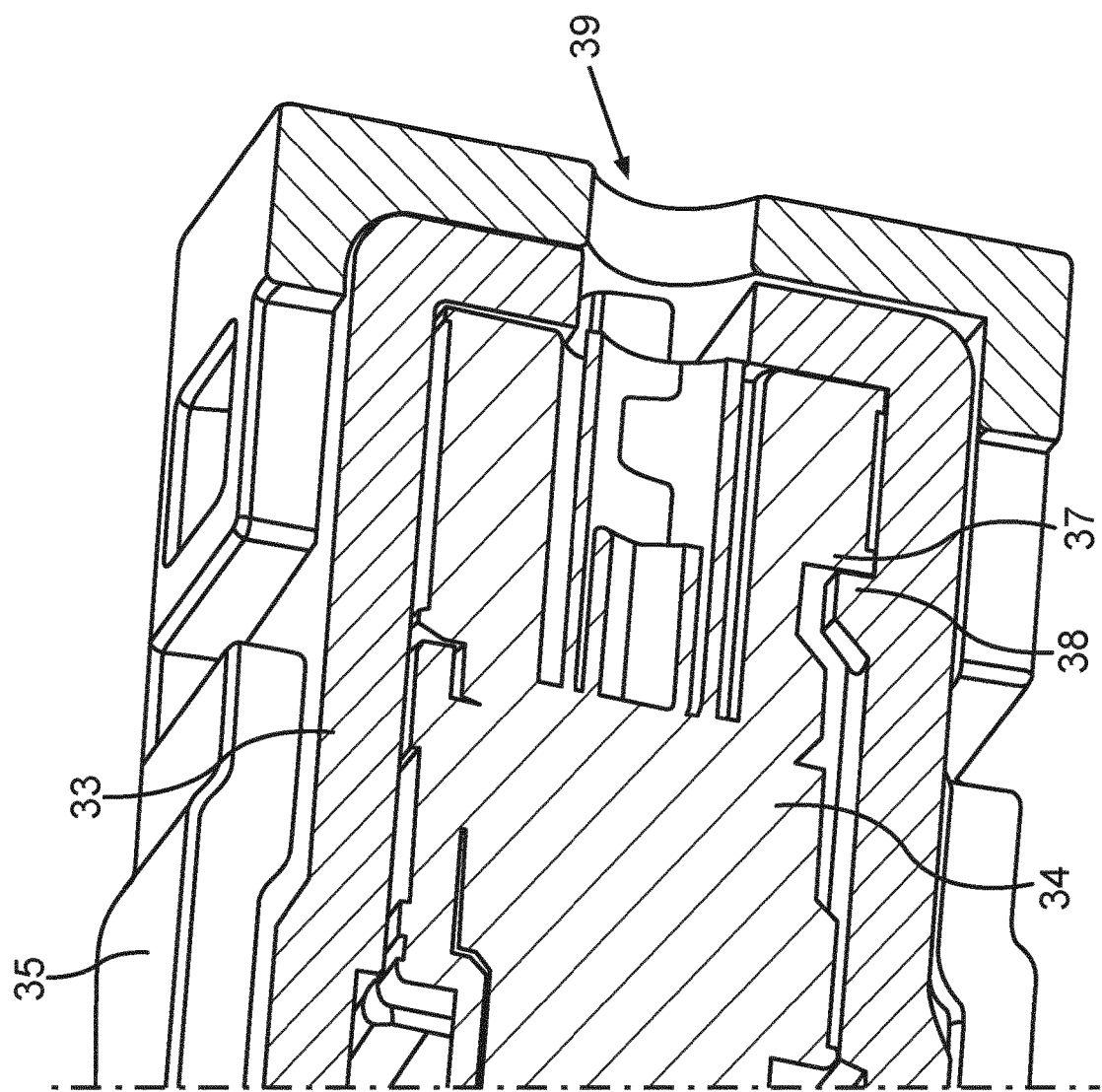
FIG. 4 shows a sectional representation through a subregion of the preinstallation assembly in accordance with FIG. 3.

FIG. 4 shows the perspective sectional representation along the section line IV-IV in FIG. 3. Here, the sectional plane is shown in the y-z plane and in the region of the receiving slot 33, the second electrical plug connector 34 and the cover 35. It can be seen that the second electrical plug connector 34 is arranged with a snap-fit element 37 snap-fitted to a counter snap-fit element 38 in the receiving slot 33. Further snap-fit connections can also be provided in this regard. Furthermore, a cable passage 39 can be seen in the cover 35 and in the receiving slot 33.

Figure 5:
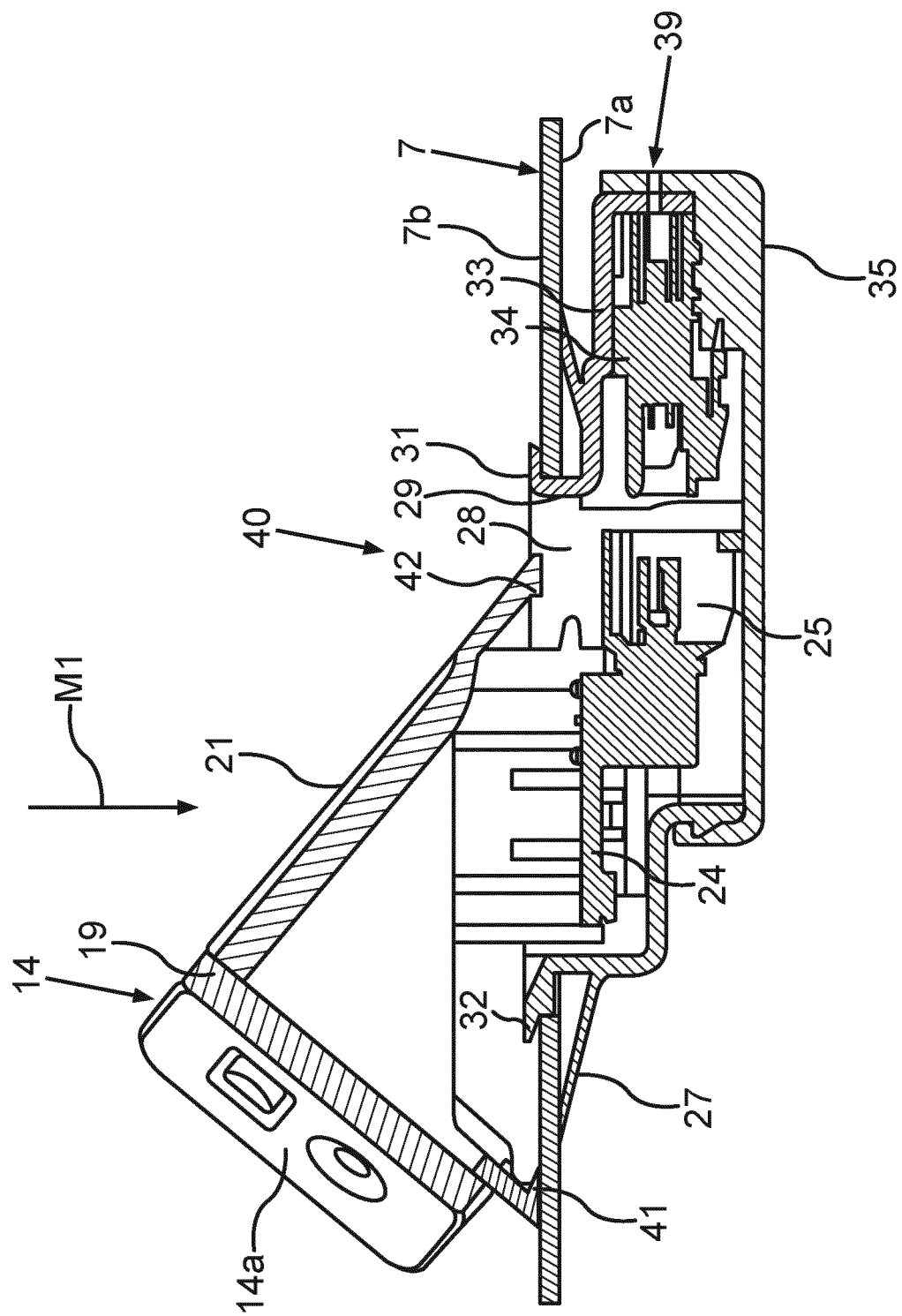
FIG. 5 shows a horizontal sectional representation through an arrangement with a camera and the preinstallation assembly in accordance with FIG. 3 in an intermediate installation state.

FIG. 5 shows a horizontal sectional representation of the intermediate installation state of the arrangement (sectional plane is the x-z plane).

As already explained with reference to FIG. 3, provision is made in the installation method to firstly provide the wall 7 and thus the interior compartment 4. In particular, the recess 17 is produced in the wall 7. Furthermore, the reinforcement part 26 is then provided. The installation steps culminating in the achievement of the installation state in FIG. 3 have already been explained.

Furthermore, the camera 14 is then provided in the assembled state. As is then already shown in FIG. 5, starting from the state in FIG. 3 the camera 14 is guided along a first installation direction M1 toward the wall 7 in the region of the recess 17. The first installation direction M1 is in particular a linear installation direction. The camera 14 is thus guided from the side of the wall 7 opposite the reinforcement part 26 toward this wall 7 in a direction perpendicular to the plane of the wall and thus perpendicular to the plane of the recess 17. Here, the first electrical plug connector is guided through the recess 17 until it is positioned fully on the side of the wall 7 on which the receiving slot 33 is also located. Here, the first electrical plug connector 25 is guided into this insertion space 28 of the reinforcement part 26.

Figure 6:
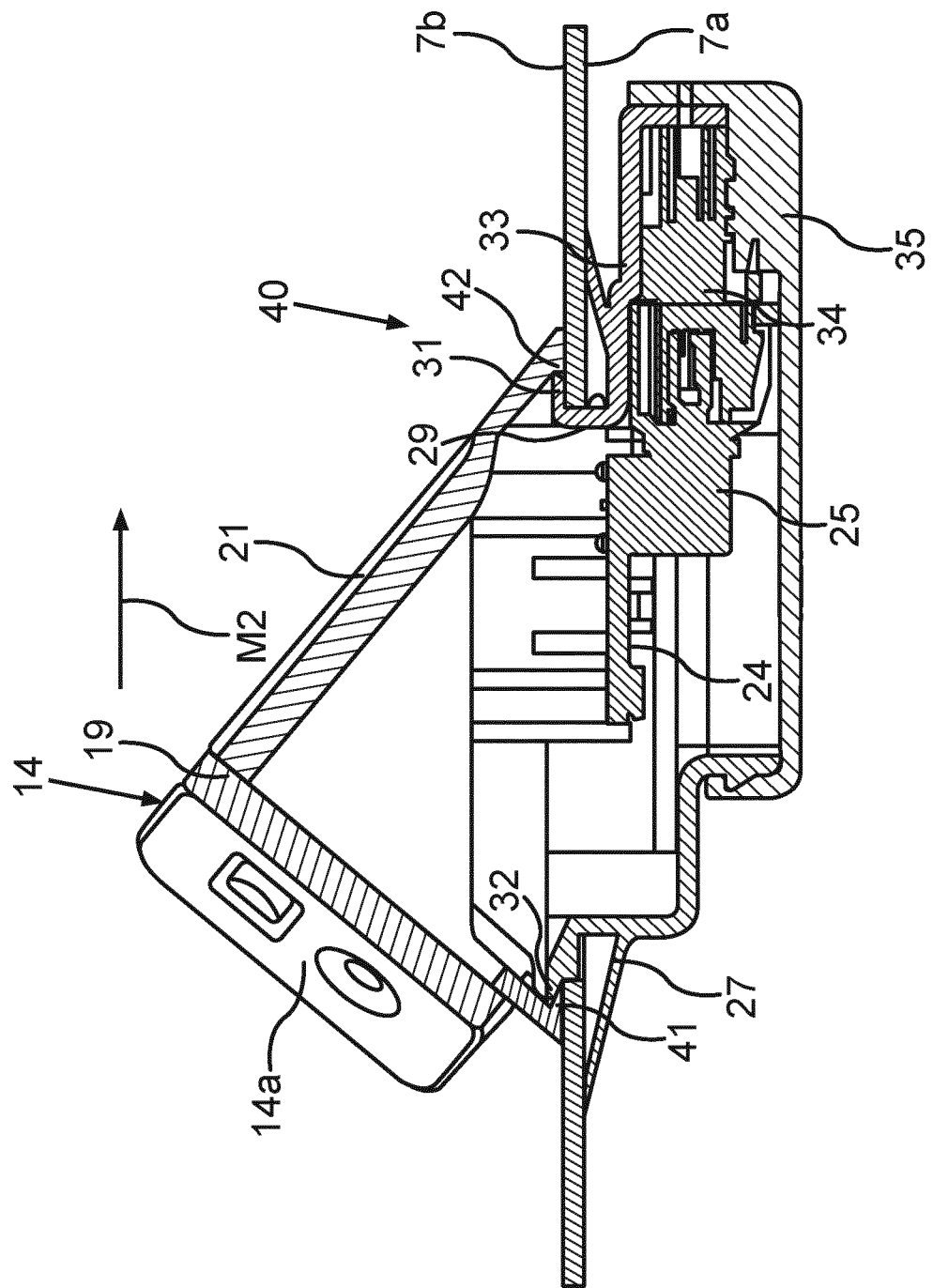
FIG. 6 shows the representation in accordance with FIG. 5 in the installed end state of the camera on the reinforcement part.

Once this movement of the camera 14 along the first installation direction M1 is complete, then an intermediate installation state is achieved as shown in FIG. 5. It can also be seen here that the two electrical plug connectors 25 and 34 are still arranged spaced apart from one another. This arrangement 40 is subsequently brought into the installed end state. To this end, starting from the intermediate installation state according to FIG. 5, the camera 14 is displaced relative to the reinforcement part 26 along a second installation direction M2, as shown in FIG. 6. The second installation direction M2 is in particular completely linear. The second installation direction M2 is parallel to a plane in which the recess 17 extends in a planar manner.

This displacement in the second installation direction M2 continues until the end position of the camera 14 relative to the reinforcement part 26 has been reached. In this regard, FIG. 6 shows this end position in a corresponding horizontal sectional representation as in FIG. 5. In this end position, an automatic connected state of the first electrical plug connector 25 with the second electrical plug connector 34 is then also reached. As a result of this linear displacement, these electrical plug connectors 25 and 34 are also moved directly toward one another and in this regard these plug connectors 25 and 34 automatically interlock and are joined together. In particular, during this installation process a blind joining of these plug connectors 25 and 34 is thus also achieved automatically.

Furthermore, it can also be seen that, during this linear displacement in this second installation direction M2, coupling elements 41 of the camera 14 are coupled to the counter coupling elements 32. In particular, it is provided here in accordance with the intended purpose that the coupling elements 41 and the counter coupling elements 32 interlock. This also means that they are arranged overlapping one another in this second installation direction M2 when the installed end state of the camera is reached. This can be seen in FIG. 6. The coupling elements 41 and the counter coupling elements 32 are preferably inclined obliquely on the contact surfaces which face toward one another and rest on one another. As a result, it is achieved that, on the one hand, this coupling is maintained in a mechanically stable manner and, when displaced in this installation direction M2, the camera 14 is also automatically drawn to and pressed against the wall 7 in the first installation direction M1.

Furthermore, it can also be seen in FIG. 6 in the installed end position of the camera 14 that, on the opposite side to the coupling elements 41 and the counter coupling elements 32, a snap-fit connection is embodied between the counter snap-fit elements 31 of the reinforcement part 26 and the snap-fit elements 42 of the camera 14. In this sectional plane, corresponding mechanical couplings are thus realized on opposite sides of the recess 17 between the camera 14 on the one hand and the reinforcement part 26 on the other hand. In this context, both the coupling connection with the coupling elements 41 and the counter coupling elements 32 and also the snap-fit connection between the snap-fit elements 42 and the counter snap-fit elements 31 are embodied fully on the side of the wall 7 on which the housing 20 of the camera 14 is also located. As can furthermore also be seen in FIG. 5 and FIG. 6, the insertion space 28 is dimensioned such that the first electrical plug connector 25 is movable or is moved in accordance with the intended purpose over its entire path between the intermediate installation state and the end position in order then also to be able to reach the end state in the position shown in FIG. 6.

As can furthermore also be seen in FIG. 6, the snap-fit connection between the snap-fit elements 42 and the counter snap-fit elements 31 in this second installation direction M2 is not of an interlocking type. A simple release of this installed end position is thus also enabled. In one exemplary embodiment, this can take place by the cover 14a being removed. Starting from this opening, a tool can then be used to engage into the housing 20 until a snap-fit connection between the snap-fit elements 42 and the counter snap-fit elements 31 is reached from the inside and can be uncoupled accordingly. As a result, the camera 14 is uncoupled again at this point at which the snap-fit connection is embodied. It is then also possible to release the coupled state between the coupling elements 41 and the counter coupling elements 32 by means of a displacement against the installation direction M2. The camera 14 can then in turn be removed from the wall 7 and the reinforcement part 26 against the first installation direction M1.

In particular, the camera 14 is held connected to the wall 7 only by this said snap-fit connection and only by this said coupling connection with the reinforcement part 26. Additional fastening elements, such as screws or the like, are not provided and not required.

FIG. 7 shows a perspective sectional representation of the installed end state of the camera 14 on the wall 7 and the reinforcement part 26, as has already been explained with reference to FIG. 6 and shown in the sectional representation in FIG. 6. However, the sectional plane shown in FIG. 7 differs from that shown in FIG. 6, in particular not through the middle of the in this case three pairs of snap-fit elements 42 and counter snap-fit elements 31 (as in FIG. 6) but instead in the region of outer snap-fit elements 42 and counter snap-fit elements 31, as well as corresponding outer coupling elements 41 and counter coupling elements 32.

It should also be noted that when the camera 14 is displaced along the second installation direction M2, an edge 21a of the housing part in the form of the housing arm 21 is pushed past the counter snap-fit elements 31 and then snap-fitted therebehind to these counter snap-fit elements 31 with the snap-fit elements 42.

In particular, a subregion of the insertion space 28 can be formed by the receiving slot 33.

LIST OF REFERENCE CHARACTERS

1 Household appliance
2 Housing
3 Outer housing
4 Interior compartment
5 Receiving space
6 Side wall
7 Side wall
7a Outer side
7b Inner side
8 Bottom wall
9 Ceiling wall
10 Rear wall
11 Intermediate space
12 Thermal insulation material
13 Door
14 Camera
14a Cover
15 Reinforcement part
16 Arrangement
17 Recess
18 Lens
19 Closing element
20 Housing
21 Housing arm
22 Electronics module
23 Connector module
24 Circuit board
25 Plug connector
26 Reinforcement part
27 Contact flange
28 Insertion space
29 Collar
30 Web
31 Counter snap-fit element
32 Counter coupling element
33 Receiving slot
34 Plug connector
35 Cover
36 Preinstallation assembly
37 Snap-fit element
38 Counter snap-fit element
39 Cable passage
40 Arrangement
41 Coupling element
42 Snap-fit element
M1 First installation direction
M2 Second installation direction

The invention claimed is:

1. A method for installing a camera in a household appliance, the method comprising:
   providing an interior compartment of the household appliance with a recess formed in a wall thereof;
   providing a camera with a housing and a first electrical plug connector disposed in the housing,
   providing a reinforcement part which is separate from the camera and which is configured for direct mechanical connection to the camera through the recess in the wall;
   positioning the housing of the camera and the reinforcement part on opposite sides of the wall;
   fastening the reinforcement part to the wall in a region of the recess;
   moving the camera toward the reinforcement part along a first installation direction perpendicular to a plane of the recess, to join the camera and the reinforcement part together through the recess and to produce an intermediate installation state in which the camera and the reinforcement part are arranged on the opposite sides of the wall;
   starting from the intermediate installation state, displacing the camera relative to the reinforcement part in a second installation direction parallel to the plane of the recess until an end position of the camera on the reinforcement part is reached; and
   upon reaching the intermediate installation position, guiding the first electrical plug connector of the camera fully through the recess such that, when the camera is displaced relative to the reinforcement part along the second installation direction the first electrical plug connector on a side of the wall on which a second electrical plug connector is also located is moved toward the second electrical plug connector, and as a result of this movement along the second installation direction the first electrical plug connector is automatically joined to the second electrical plug connector.

2. The method according to claim 1, wherein a displacement along the second installation direction is a linear displacement.

3. The method according to claim 1, which further comprises providing a second electrical plug connector installed in the reinforcement part, the second electrical plug connector being configured for connection to the first electrical plug connector, and the second electrical plug connector is a separate component and is arranged snap-fitted on the reinforcement part by way of a snap-fit connection.

4. The method according to claim 3, which further comprises providing a cover installed on the reinforcement part and enclosing the second electrical plug connector at least in regions between the reinforcement part and the cover which is separate therefrom.

5. The method according to claim 4, wherein the reinforcement part, the cover, and the second electrical plug connector form a preinstallation assembly, and moving the preinstallation assembly in the first installation direction toward the camera in order to be connected to the camera.

6. The method according to claim 1, which comprises snap-fitting the reinforcement part to the recess.

7. The method according to claim 1, wherein, when the camera is moved along the second installation direction, snap-fit elements on the camera are snap-fitted to counter snap-fit elements on the reinforcement part.

8. The method according to claim 7, wherein the reinforcement part is arranged on the wall coming from one side of the wall such that the counter snap-fit elements are guided through the recess and extend to an opposite side of the wall, from which the camera is guided toward the wall along the first installation direction.

9. A method for installing a camera in a household appliance, the method comprising:
   providing an interior compartment of the household appliance with a recess formed in a wall thereof;
   providing a camera with a housing and a first electrical plug connector disposed in the housing,
   providing a reinforcement part which is separate from the camera and which is configured for direct mechanical connection to the camera through the recess in the wall;
   positioning the housing of the camera and the reinforcement part on opposite sides of the wall;
   fastening the reinforcement part to the wall in a region of the recess;
   moving the camera toward the reinforcement part along a first installation direction perpendicular to a plane of the recess, to join the camera and the reinforcement part together through the recess and to produce an intermediate installation state in which the camera and the reinforcement part are arranged on the opposite sides of the wall;
   starting from the intermediate installation state, displacing the camera relative to the reinforcement part in a second installation direction parallel to the plane of the recess until an end position of the camera on the reinforcement part is reached; and
   wherein, when the camera is moved along the second installation direction, coupling elements on the camera are coupled to counter-coupling elements on the reinforcement part, with the coupling elements engaging behind and overlapping the counter-coupling elements in the second installation direction and holding the camera on the reinforcement part.

10. The method according to claim 9, wherein the camera is held on the reinforcement part and is pressed onto the wall in a direction of the reinforcement part.

11. The method according to claim 9, wherein the reinforcement part is arranged on the wall coming from one side of the wall such that the counter-coupling elements are guided through the recess and extend to an opposite side of the wall, from which the camera is guided toward the wall along the first installation direction.

12. A household appliance, comprising:
   a camera with a housing and a first electrical plug connector arranged in said housing;
   a reinforcement part separate from said camera, said reinforcement part being configured for direct connection to said housing through a recess formed in a wall of an interior compartment of the household appliance, with said housing and said reinforcement part being arranged on mutually opposite sides of the wall;
   said reinforcement part having a second electrical plug connector configured for connection to said first electrical plug connector, and said reinforcement part having an insertion space into which a portion of said camera extends in a direction perpendicular to a plane of said recess;
   said insertion space being dimensioned, in a plane parallel to the recess, to enable the portion of said camera during an installation of said camera on said reinforcement part to move relative to said reinforcement part in a direction parallel to the plane of said recess and to reach a defined end position of said camera in said insertion space; and a cover arranged on said reinforcement part and enclosing said second electrical plug connector at least in regions between said reinforcement part and said cover.

13. The household appliance according to claim 12, wherein said reinforcement part has a contact flange for resting on the wall, and is formed with a receiving slot integrated on said contact flange, in which said second electrical plug connector is arranged.

14. The household appliance according to claim 13, wherein said second electrical plug connector is snap-fitted in said receiving slot of said contact flange by a snap-fit connection.

15. The household appliance according to claim 12, wherein counter snap-fit elements of said reinforcement part protrude through said recess and said camera, on a side of said wall on which said camera is arranged, is snap-fitted with snap-fit elements to said counter snap-fit elements of said reinforcement part.

16. The household appliance according to claim 12, wherein said reinforcement part carries counter-coupling elements that interlock with, and overlap, coupling elements of said camera in a direction in a plane parallel to said recess.

* * * * *